(12) United States Patent
Kim (10) Patent No.: US 12,204,409 B2
(45) Date of Patent: Jan. 21, 2025

(54) MEMORY DEVICES

(71) Applicant: SAMSUNG ELECTRONICS CO., LTD., Suwon-si (KR)

(72) Inventor: Hyun-Jin Kim, Suwon-si (KR)

(73) Assignee: Samsung Electronics Co., Ltd. (KR)

( * ) Notice: Subject to any disclaimer, the term of this patent is extended or adjusted under 35 U.S.C. 154(b) by 56 days.

(21) Appl. No.: 18/167,025

(22) Filed: Feb. 9, 2023

(65) Prior Publication Data

US 2024/0020196 A1 Jan. 18, 2024

(30) Foreign Application Priority Data

Jul. 12, 2022 (KR) .......................... 10-2022-0085640

(51) Int. Cl.
*G06F 11/10* (2006.01)
*G06F 3/06* (2006.01)

(52) U.S. Cl.
CPC ........ *G06F 11/1068* (2013.01); *G06F 3/0604* (2013.01); *G06F 3/061* (2013.01); *G06F 3/0614* (2013.01); *G06F 3/0616* (2013.01); *G06F 3/0638* (2013.01); *G06F 3/0658* (2013.01); *G06F 3/0679* (2013.01); *G06F 11/1004* (2013.01); *G06F 2212/1016* (2013.01); *G06F 2212/1032* (2013.01)

(58) Field of Classification Search
CPC .... G06F 11/1068; G06F 3/0604; G06F 3/061; G06F 3/0614; G06F 3/0616; G06F 3/0638; G06F 3/0658; G06F 3/0679; G06F 11/1004; G06F 2212/1016; G06F 2212/1032

USPC ....... 714/764, 766, 768, 769, 773, 799, 800, 714/804; 365/200, 201, 185.09
See application file for complete search history.

(56) References Cited

U.S. PATENT DOCUMENTS 7,454,668 B1 * 11/2008 Yochai ................ G06F 11/1435
  714/52
8,468,423 B2 * 6/2013 Zvibel ................. G06F 11/1004
  714/766

(Continued)

FOREIGN PATENT DOCUMENTS

JP  2013205853  10/2013
KR  1631162  6/2016

OTHER PUBLICATIONS

Zhang et al., Improving Data Integrity in Linux Software RAID with Protection Information (T10-PI), 2018, IEEE, pp. 609-615. (Year: 2018).*

(Continued)

*Primary Examiner* — John J Tabone, Jr.
(74) *Attorney, Agent, or Firm* — Fish & Richardson P.C.

(57) ABSTRACT

A memory device includes a non-volatile memory and a memory controller for writing data received from a host to the non-volatile memory. The memory controller is configured to receive, from the host, first data integrity field (DIF) information associated with the data, the first DIF information including individual cyclic redundancy check (CRC) information generated based on the data; generate, based on the first DIF information, second DIF information having a structure that is different from a structure of the first DIF information; and write the second DIF information to the non-volatile memory.

21 Claims, 10 Drawing Sheets

(56) References Cited

U.S. PATENT DOCUMENTS

| | | | |
|---|---|---|---|
| 8,473,816 B2* | 6/2013 | Zvibel | G06F 11/1004 714/766 |
| 9,037,776 B2 | 5/2015 | Yu | |
| 9,086,983 B2 | 7/2015 | Porterfield | |
| 9,170,757 B1* | 10/2015 | Shihadeh | G06F 3/0608 |
| 9,384,128 B2 | 7/2016 | Tuers et al. | |
| 9,542,264 B2 | 1/2017 | Im et al. | |
| 10,459,785 B2 | 10/2019 | Dusija et al. | |
| 10,853,307 B2 | 12/2020 | Hargrave et al. | |
| 11,218,164 B2 | 1/2022 | Lin et al. | |
| 11,606,104 B1* | 3/2023 | Segal | G06F 11/1415 |
| 2005/0044349 A1* | 2/2005 | Henry | G06F 21/71 713/150 |
| 2009/0157973 A1* | 6/2009 | Li | G06F 3/0656 711/133 |
| 2011/0029847 A1* | 2/2011 | Goldenberg | G06F 11/1004 714/E11.002 |
| 2012/0166909 A1* | 6/2012 | Schmisseur | G06F 11/1076 714/E11.062 |
| 2013/0060741 A1* | 3/2013 | Zvibel | G06F 11/1004 707/699 |
| 2013/0061110 A1* | 3/2013 | Zvibel | G06F 11/1004 714/E11.03 |
| 2013/0346723 A1* | 12/2013 | Kawamura | G06F 3/0623 711/170 |
| 2014/0122745 A1* | 5/2014 | Singh | G06F 11/1092 710/2 |
| 2015/0135042 A1* | 5/2015 | Im | G06F 11/1004 714/807 |
| 2018/0024744 A1* | 1/2018 | Kim | G06F 3/0688 711/103 |
| 2019/0004888 A1* | 1/2019 | Chagam Reddy | G06F 11/0727 |
| 2019/0065488 A1* | 2/2019 | Colline | G06F 16/1873 |
| 2020/0042725 A1* | 2/2020 | Bolkhovitin | G06F 21/64 |
| 2022/0291874 A1* | 9/2022 | Kurata | G06F 3/0659 |
| 2024/0020196 A1* | 1/2024 | Kim | G06F 11/1068 |

OTHER PUBLICATIONS

Partial European Search Report in European Appln. No. 23173947.5, mailed on Nov. 24, 2023, 12 pages.

* cited by examiner

MEMORY DEVICES

CROSS-REFERENCE TO RELATED APPLICATION

This application claims priority to and the benefit of Korean Patent Application No. 10-2022-0085640 filed in the Korean Intellectual Property Office on Jul. 12, 2022, the entire contents of which are incorporated herein by reference.

BACKGROUND

(a) Field

The present disclosure relates to memory devices and methods for operating the same.

(b) Description of the Related Art

A memory device may be classified as a volatile memory device or as a non-volatile memory device. A volatile memory device deletes stored data when a power supply discontinued, while a non-volatile memory device maintains the stored data even in the absence of a power supply. Examples of volatile memory devices include a RAM (Random Access Memory), an SRAM (Static RAM), a DRAM (Dynamic RAM), and a SDRAM (Synchronous DRAM), and examples of non-volatile memory devices include a ROM (Read Only Memory), a PROM (Programmable ROM), an EPROM (Electrically Programmable ROM), an EEPROM (Electrically Erasable and Programmable ROM), a flash memory device, a PRAM (Phase-change RAM), a MRAM (Magnetic RAM), a RRAM (Resistive RAM), and a FRAM (Ferroelectric RAM).

SUMMARY

An objective to be solved is to provide memory devices and associated methods for increasing storage efficiency, life-span, and reliability of non-volatile memories.

Some implementations of the present disclosure provides a memory device including: a non-volatile memory; and a memory controller configured to write data received from a host to the non-volatile memory, wherein the memory controller is configured to: receive, from the host, first data integrity field (DIF) information associated with the data, the first DIF information including cyclic redundancy check (CRC) information generated based on the data, generate, based on the first DIF information, second DIF information having a structure that is different from a structure of the first DIF information, and write the second DIF information to the non-volatile memory.

Another implementation of the present disclosure provides a memory device including: a non-volatile memory; and a memory controller configured to: receive, from a host, first data integrity field (DIF) information corresponding to data to be written to the non-volatile memory, and determine whether to write the first DIF information to the non-volatile memory based on an operation mode.

Another implementation of the present disclosure provides a method for operating a memory device, the method including: receiving, from a host, first data integrity field (DIF) information corresponding to data to be written to a non-volatile memory; generating, based on the first DIF information, second DIF information having a structure that is different from a structure of the first DIF information; and writing the second DIF information to the non-volatile memory.

DETAILED DESCRIPTION

In the following detailed description, only certain implementations have been shown and described, simply by way of illustration. As those skilled in the art would realize, the described implementations may be modified in various different ways, all without departing from the spirit or scope of the disclosure.

Accordingly, the drawings and description are to be regarded as illustrative in nature and not restrictive, and like reference numerals designate like elements throughout the specification.

An expression recited in the singular may be construed as singular or plural unless the expression "one", "single", etc., is used. Terms including ordinal numbers such as first, second, and the like, will be used only to describe various components, and are not to be interpreted as limiting these components. The terms may only be used to differentiate one component from others. Moreover, "based on," as used herein, means "based at least partially on."

Figure 1:
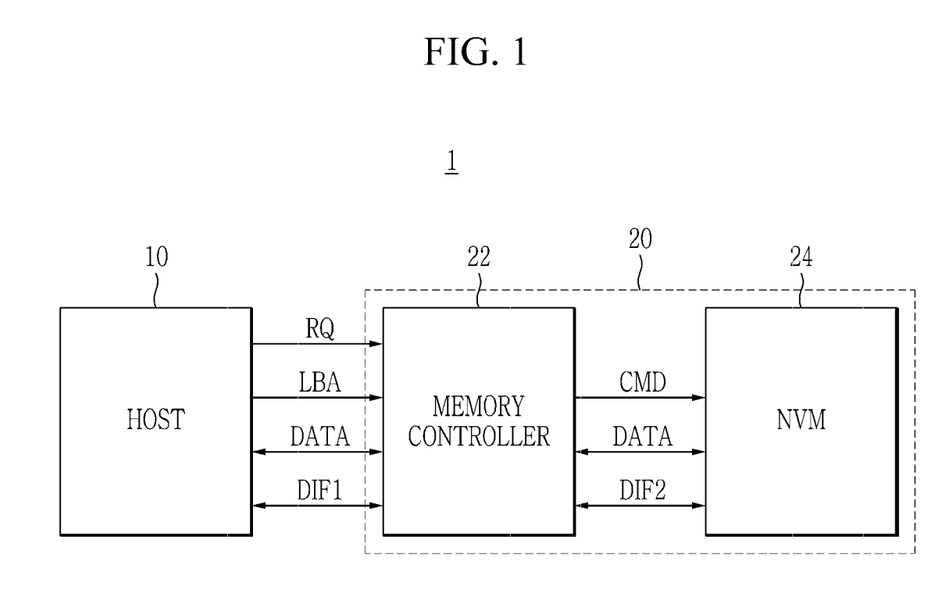
FIG. 1 and FIG. 2 show an example memory system.

FIG. 1 shows a memory system according to some implementations of the present disclosure. The memory system may include a host 10 and a memory device 20. The host 10 may transmit a request RQ and a logical block address LBA to the memory device 20 to read data stored in the memory device 20, and may receive the read data DATA from the memory device 20. In another way, the host 10 may transmit a request RQ, a logical block address LBA, and data DATA to be written to the memory device 20 to the memory device 20 to write the data to the memory device 20. Here, the logical block address LBA may indicate a unit defined according to an operating system of the host 10.

The host 10 may be based on various types of interface protocols such as the PCI (Peripheral Component Interconnection) protocol, the PCI-E (PCI-express) Protocol, the ATA (Advanced Technology Attachment) Protocol, the Serial-ATA protocol, the Parallel-ATA protocol, the SCSI (Small Computer System Interface) Protocol, the ESDI (Enhanced Small Disk Interface) Protocol, the IDE (Integrated Drive Electronics) Protocol, the MIPI (Mobile Industry Processor Interface) Protocol, the UFS (Universal Flash Storage) Protocol, the USB (Universal Serial Bus) Protocol, and the MMC (multimedia card) Protocol to transmit/receive data to/from the memory device 20.

The memory device 20 may include a memory controller 22 and a non-volatile memory (NVM) 24.

The memory controller 22 may transmit a command CMD for reading the data written to the non-volatile memory 24 according to the request RQ and the logical block address LBA provided by the host 10 to the non-volatile memory 24, and may provide the data DATA provided by the non-volatile memory 24 to the host 10 in response to it. In another way, the memory controller 22 may transmit a command CMD for writing the data DATA to the non-volatile memory 24 to the non-volatile memory 24 according to the request RQ, the logical block address LBA, and the data DATA to be written to the memory device 20 provided by the host 10. The memory controller 22 may control general operations of the non-volatile memory 24.

The non-volatile memory 24 may be realized with non-volatile memory devices such as a NAND flash, a NOR flash, a PRAM, a MRAM, a ReRAM, or a PRAM. The non-volatile memory 24 may include a plurality of blocks, and the respective blocks may include a plurality of pages. The respective pages may include a region in which data (e.g., user data) are stored and a region in which meta data are stored, and examples of the meta data include a data header, DIF (Data Integrity Field) information, PI (Protection Information), and ECC (Error Correction Code) data. In the present specification, the DIF information and the PI may be used in a mixed way for indicating same components.

Figure 2:
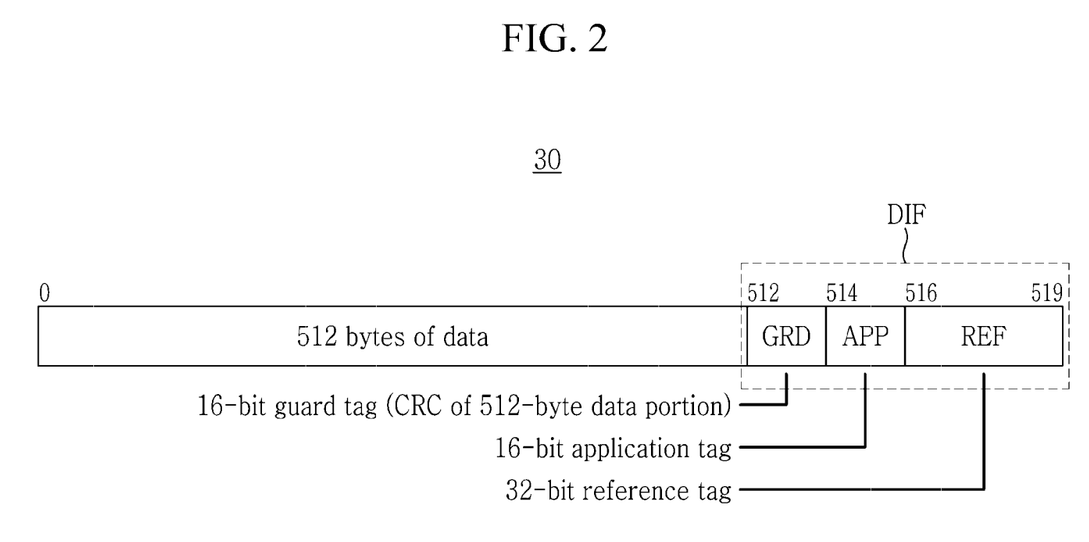

The DIF information relates to a management method for protecting a data storage device such as the memory device 20 from data corruption. Referring to FIG. 2, when the host 10 reads data from the memory device 20 or writes data to the memory device 20, a data structure 30 in which DIF information DIF is added to user data may be transmitted between the host 10 and the memory controller 22, e.g., from the host 10 to the memory controller 22. The DIF information may be used for data integrity/verification purposes, e.g., to determine whether the data is requested by the host 10, whether the data has errors, and/or whether the data is written to a correct position.

The DIF information DIF may include a guard tag GRD, an application tag APP, and a reference tag REF. For example, 64-bit (8-byte) DIF information DIF may be added to 512-bytes-based user data.

The guard tag GRD may include cyclic redundancy check (CRC) information calculated for user data, and may be used to verify integrity of data when the data are input and output. The guard tag GRD may be set to be 2 bytes for the 512-byte user data. The guard tag GRD may be generated by the host 10 and may be provided to the memory device 20. In some implementations, the guard tag GRD is entirely the CRC information. For example, when the CRC information is 2B, the guard tag GRD may be 2B.

The CRC information can have different forms in various implementations. To generate CRC information, data (e.g., data 300 or data 320) is processed using one or more suitable algorithms. For example, in some implementations, the CRC information is a remainder of a modulo-2 polynomial division of the data. Non-limiting types of CRC information that can be used according to this disclosure (e.g., included in guard tags GRD according to this disclosure) include CRC-8, CRC-16, CRC-32, CRC-64, and CRC-1.

The application tag APP is a field arbitrarily written by the host that transmits data, and may be used to determine a matching state of the application requesting data input and output according to uses. The application tag APP may be set to be 2 bytes for the 512-byte user data.

The reference tag REF may include some (e.g., four last digits) of the logical block address LBA indicating a data address, and may be used to verify whether the data are input/output to/from the correct position, e.g., the correct position in the non-volatile memory. The reference tag REF may be set to be 4 bytes for the 512-byte user data.

The particular details, such as sizes and orders, of the respective fields shown in the data structure 30 in which the DIF information DIF is added to the user data shown in FIG. 2 are non-limiting examples, which may be different in various implementations.

Referring to FIG. 1, in the present implementation, the host 10 and the memory controller 22 may transmit and receive DIF information DIF1 to/from each other, and the memory controller 22 and the non-volatile memory 24 may transmit and receive DIF information DIF2 to/from each other. In this instance, the DIF information DIF1 and the DIF information DIF2 may have different structures/formats/configurations to increase storage efficiency on the non-volatile memory 24 and increase the life-span and reliability of data storage on the non-volatile memory 24, as will now be described in detail with reference to FIG. 3 to FIG. 8.

Figure 3:
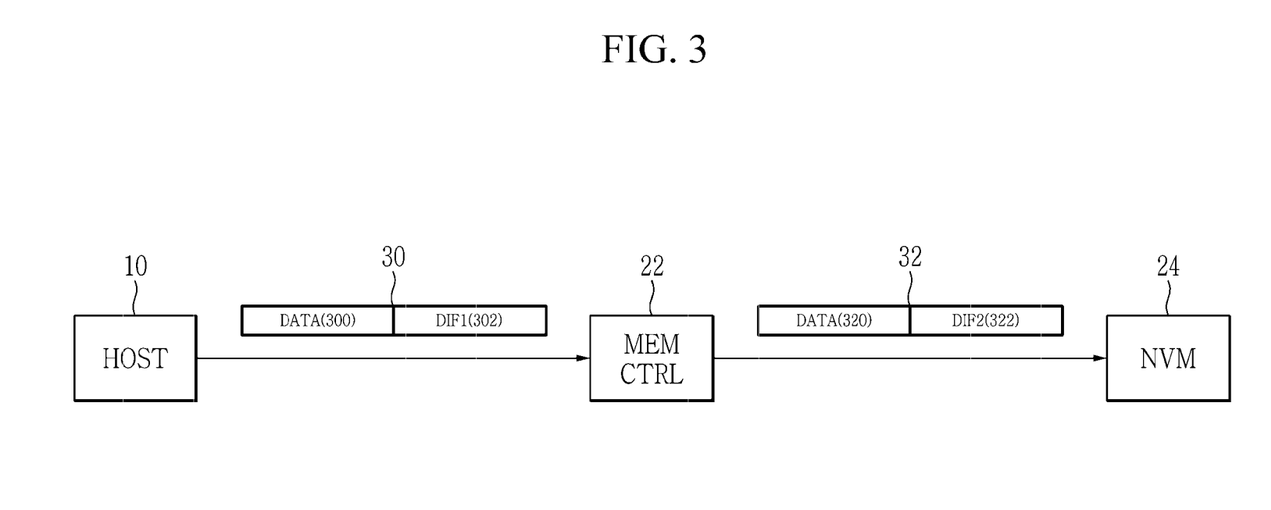
FIG. 3 shows an example memory device.

FIG. 3 shows a memory device according to some implementations.

Referring to FIG. 3, regarding the memory device 20 according to some implementations, the memory controller 22 may receive first DIF information 302 relating to data 300 to be written to the non-volatile memory 24 from the host 10, and the first DIF information 302 may include individual CRC information generated for the data 300 from the host 10. Here, the "individual" CRC information is different from "integrated" CRC information, described in further detail below. The individual CRC information includes CRC information generated for (e.g., based on) an individual portion of data defined by a predetermined size (e.g., 512 bytes), and the integrated CRC information may include CRC information generated for (e.g., based on) a data group including multiple individual portions of data (sometimes referred to as subdata) (e.g., eight individual portions of data, each portion of data being a 512 byte portion of data). For example, individual CRC information of the first DIF information 302, corresponding to the data 300, can be generated by applying a modulo-2 polynomial division process to the data 300. Also, for a data group of multiple sub-data, integrated CRC information of the data group can be generated by applying a modulo-2 polynomial division process to the entire data group or to a subset of the data group.

The memory controller 22 may generate second DIF information 322 having a different structure from the first DIF information 302, and may write second DIF information 322 to the non-volatile memory 24. The memory controller 22 may not write the first DIF information 302 to the non-volatile memory 24.

In this example, and as described in examples throughout this disclosure, data and the data's corresponding DIF information are described as being transmitted together, e.g., as a 520 byte portion of data including 512 data bytes and 8 DIF bytes. However, in some implementations, the data and the corresponding DIF can be transmitted at least partially separately, e.g., as two or more transmissions that together include the data and the corresponding DIF.

In detail, when receiving the data 300 to be written to the memory device 20 together with a writing request received from the host 10, the memory controller 22 may receive the data 300 and the first DIF information 302 in the data structure 30 described above, in which the first DIF information 302 including the guard tag GRD, the application tag APP, and the reference tag REF is appended to the data 300. Here, the guard tag GRD of the first DIF information 302 may include individual CRC information on the data 300, and may be generated by the host 10.

The memory controller 22 may generate second DIF information 322 that, in at least one aspect, has a different structure than the first DIF information 302. For example, the second DIF information 322 may include a data element that the first DIF information 302 does not include; may exclude a data element that the first DIF information 302 includes; and/or may include data elements that are reordered compared to the data elements of the first DIF information 302. The second DIF information 322 may be generated based on the first DIF information 302. In some implementations, the second DIF information 322 has a different size than the first DIF information 302, e.g., is smaller than the first DIF information 302. For example, in some implementations, the second DIF information 322 includes two fewer bytes than the first DIF information 302, because the second DIF information 322 does not include a two-byte guard tag GRD included in the first DIF information.

For example, in some implementations, the memory controller 22 may generate second DIF information 322 including the application tag APP and the reference tag REF and not including the guard tag GRD, where the guard tag GRD is included in the first DIF information 302 and includes the individual CRC information generated by the host and transmitted by the host 10. That is, the second DIF information 322 may have a structure that is different from that of the first DIF information 302, at least because the first DIF information 302 may include the guard tag GRD (including the individual CRC information), the application tag APP, and the reference tag REF, while the second DIF information 322 may include the application tag APP and the reference tag REF without including the guard tag GRD. Accordingly, in some implementations, the second DIF information 322 is generated based on the first DIF information 302 by removing the guard tag GRD (e.g., one or more bits/bytes that form the guard tag GRD) from the first DIF information 302. The memory controller 22 may transmit a data structure 32, in which data 320 are appended to second DIF information 322, to the non-volatile memory 24 for storage. The first DIF information 302 may be discarded, e.g., not stored in the non-volatile memory 24. Accordingly, the guard tag GRD generated by the host 10 may not be written to the non-volatile memory 24. Here, the data 320 may have the same value as the data 300, e.g., the data 320 can be the same as the data 300

According to the present implementation, the storage efficiency of the non-volatile memory 24 may be increased, for example, by not storing the 2-byte guard tag GRD assigned for the respective 512-byte-based data 300 in the non-volatile memory 24. For example, when eight pieces of 512-byte-based data 300 are stored in the non-volatile memory 24, a size of the guard tag GRD including individual CRC information may be at least 16 bytes, and the space obtainable by not storing the guard tag GRD in the non-volatile memory 24 may be used for another purpose, thereby increasing storage efficiency. For example, in some implementations, the extra obtained space is used to store ECC data corresponding to the stored data, such that more ECC data may be stored in the non-volatile memory 24, increasing the life-span and the read and/or write reliability of the non-volatile memory 24.

Figure 4:
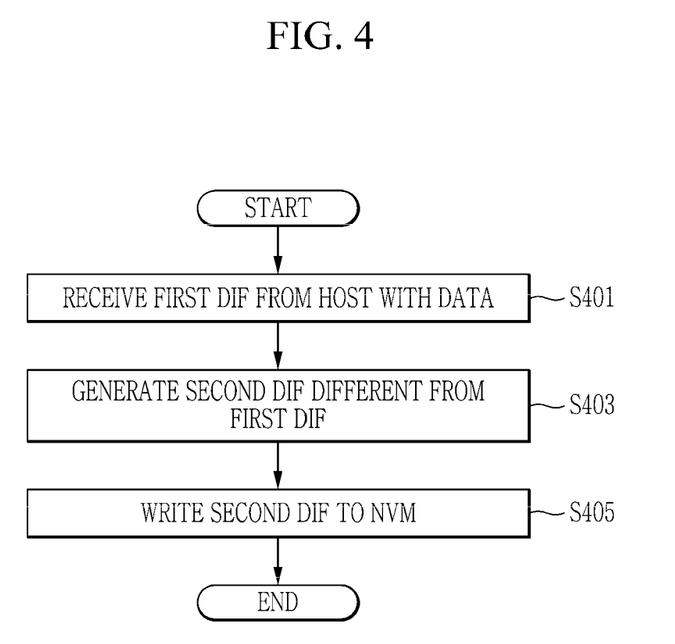
FIG. 4 shows an example method for operating a memory device.

FIG. 4 shows a method for operating a memory device according to some implementations.

Referring to FIG. 4, the method for operating a memory device may include receiving first DIF information relating to data to be written to the non-volatile memory 24 from the host 10 (S401), and generating second DIF information having a different structure from the first DIF information (S403). The method may include writing the second DIF information to the non-volatile memory (S403).

The first DIF information may include a guard tag GRD, an application tag APP, and a reference tag REF.

The guard tag GRD may include individual CRC information for data, and the guard tag GRD may not be written to the non-volatile memory 24.

A detailed content on the method for operating a memory device may refer to the description provided with reference to FIG. 1 to FIG. 3, and detailed descriptions on repeated portions applicable to the present implementation will be omitted.

Figure 5:
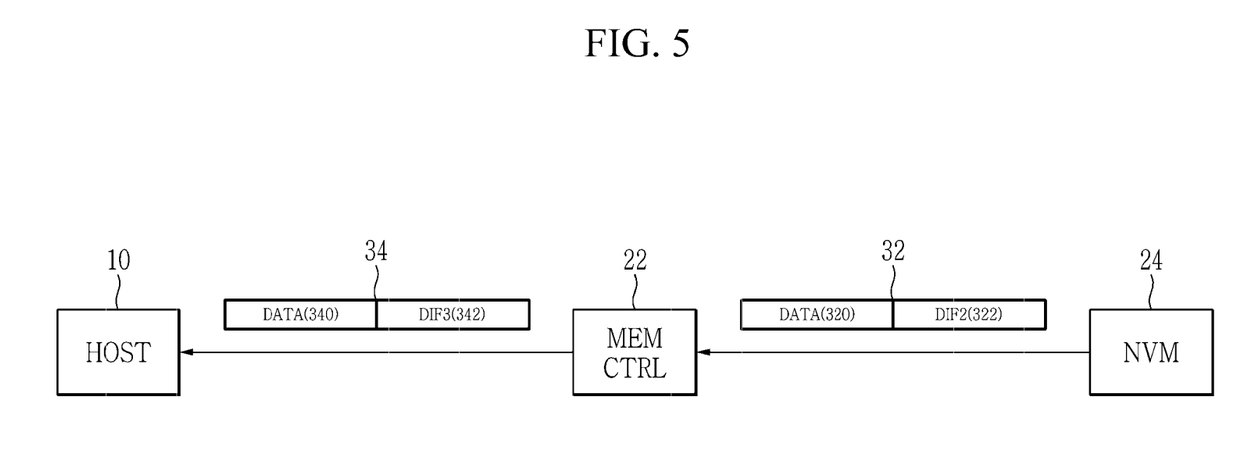
FIG. 5 shows an example memory device.

FIG. 5 shows a memory device according to some implementations relating to read operations.

Referring to FIG. 5, regarding the memory device 20 according to some implementations, the memory controller 22 may read the data 320 written to the non-volatile memory 24 and the second DIF information 322 relating to the data 320, and may transmit data 340 and third DIF information 342 to the host 20. In some implementations, the memory controller 22 generates the third DIF information 342, e.g., based on the second DIF 322 the data 340, and/or the data 320. The second DIF information 322 may include an application tag APP and a reference tag REF. The third DIF information 342 may be generated by adding the guard tag GRD to the second DIF information 322, which may not include the guard tag GRD.

To add the guard tag GRD to the second DIF information 322, in some implementations, the memory controller 22 generates individual CRC information corresponding to the data 320 read from the non-volatile memory 24, and adds the guard tag GRD, including the generated CRC information, to the second DIF information 322. For example, the memory controller 22 may apply a modulo-2 polynomial division process to the data 320 to generate the individual CRC information.

In some implementations, the individual CRC information generated by the memory controller 22 for the data 340 and included in the third DIF information 342, is the same as the individual CRC information included in the first DIF information 302 for the data 300. For example, one or more algorithms used by the memory controller to generate the individual CRC information for the data 340 can be the same as algorithms used by another entity (e.g., the host 10) to generate the individual CRC information for the data 300. Accordingly, in some implementations, the guard tag GRD included in the third DIF information 342 is the same as the guard tag GRD included in the first DIF information 302.

The memory controller 22 may receive a read request from the host 10, and may receive the data 320 from the non-volatile memory 24 in a data structure 32 in which the second DIF information 322 including the application tag APP and the reference tag REF is appended to the data 320.

When transmitting the data 340 to the host 10, the memory controller 22 may generate CRC information for the data 320 based on the data 320, and may add a guard tag to the second DIF information 322 by using the generated individual CRC information to thus generate third DIF information 342. Hence, the memory controller 22 may transmit the third DIF information 342 including the guard tag GRD, the application tag APP, and the reference tag REF in a data structure 34 in which the third DIF information 342 is appended to the data 340 to the host 10. The data 340 may have the same value as the data 320, e.g., the data 340 may be the data 320. The application tag APP and the reference tag REF included in the third DIF information 342 may be already included in the second DIF information 322 and may be the same application tag APP and reference tag REF as were included in the first DIF information 302.

In some implementations, the memory controller 22 generates the guard tag GRD that is not stored in the non-volatile memory 24 and transmits the same to the host 10 so that it may fit an interface protocol between the host 10 and the memory controller 22. For example, the host 10, based on its interface protocol, may expect to receive a data structure 34 having a specified size and/or structure, e.g., including a guard tag GRD, so the guard tag GRD can be generated and added so that the data structure 34 accords to the interface protocol. The guard tag GRD may be regenerated based on the data 320 stored in the non-volatile memory 24, thereby improving storage efficiency of the non-volatile memory 24 (e.g., because the guard tag GRD need not be stored in the non-volatile memory) while preserving the ability to use metadata, such as the regenerated guard tag GRD, for verifying integrity of the data.

Figure 6:
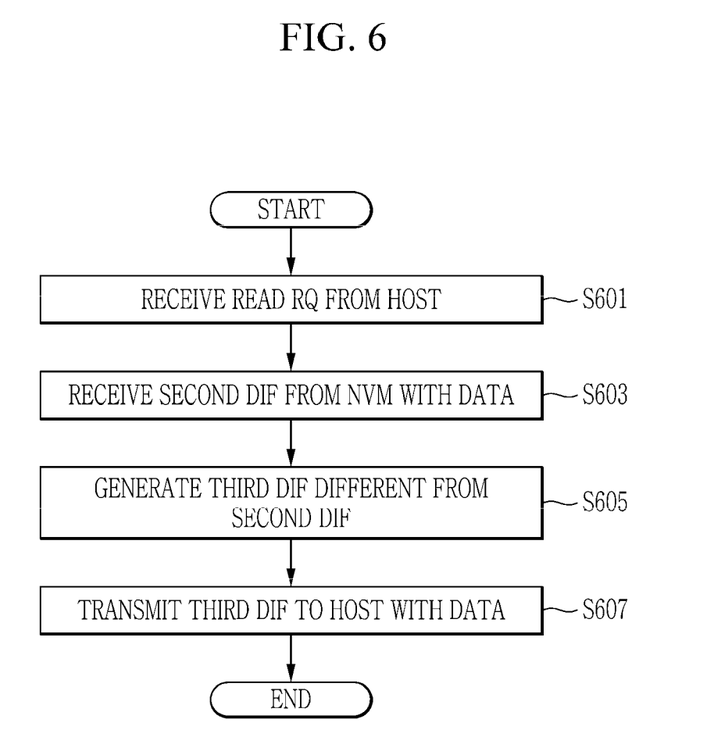
FIG. 6 shows a method for operating a memory device according to some implementations.

FIG. 6 shows a method for operating a memory device according to some implementations.

Referring to FIG. 6, the method for operating a memory device may include: receiving a read request from the host 10 (S601), and receiving the second DIF information written to the non-volatile memory 24 together with data (S603). The second DIF information may include the application tag APP and the reference tag REF.

The method may include generating third DIF information having a structure that is different from that of the second DIF information (S605). The method may include transmitting the third DIF information and the data to the host 10 (S607).

A detailed content on the method for operating a memory device may refer to the description provided with reference to FIG. 1 to FIG. 5, and detailed descriptions on repeated portions applicable to the present implementation will be omitted.

Figure 7:
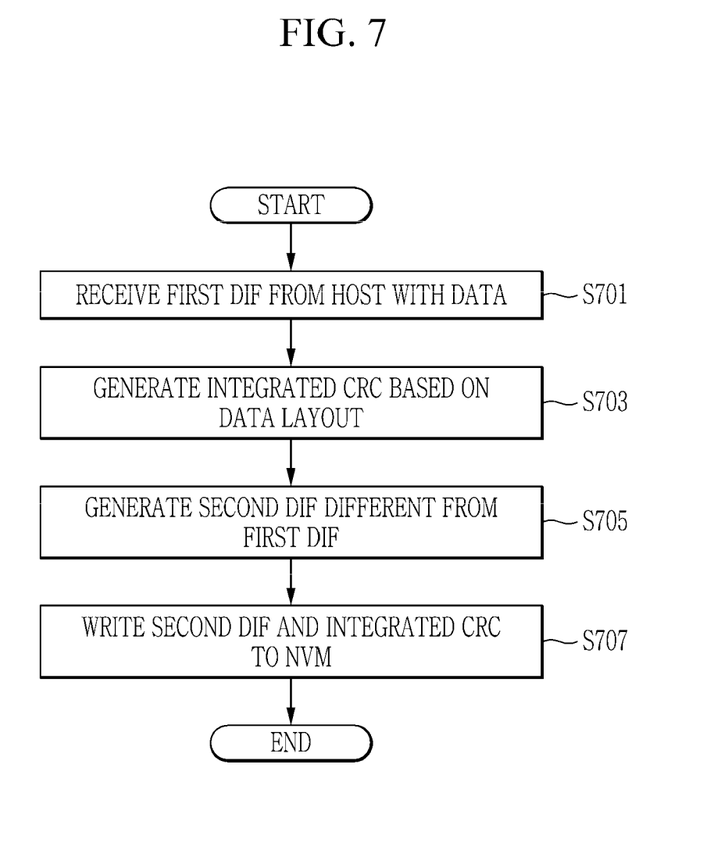
FIG. 7 shows a method for operating a memory device according to some implementations.

FIG. 7 shows a method for operating a memory device according to some implementations.

Referring to FIG. 7, the method for operating a memory device may include: receiving first DIF information relating to data to be written to the non-volatile memory 24, and the data, from the host 10 (S701), and generating integrated CRC information based on a data layout of the non-volatile memory 24 (S703). As described below, the data can include multiple sub-data, and the first DIF information can include multiple DIF information, each of the multiple DIF information including individual CRC information corresponding to a corresponding sub-data.

The method may include generating second DIF information having a structure that is different from that of the first DIF information (S705). The second DIF information may be generated based on the first DIF information and/or based on the received data. The method may include writing the integrated CRC information and the second DIF information to the non-volatile memory (S707). The second DIF information can have a different structure from the first DIF information as described above, e.g., by excluding one or more data elements/structures that are included in the first DIF information, such as a guard tag GRD and/or individual CRC information.

The first DIF information may include a guard tag GRD, an application tag APP, and a reference tag REF. The guard tag GRD may include individual CRC information on the data, and the guard tag GRD may not be written to the non-volatile memory 24. For example, the second DIF information may not include the guard tag GRD and/or may not include the individual CRC information.

That is, regarding the memory device 20 according to some implementations, the memory controller 22 may generate integrated CRC information according to the data layout of the non-volatile memory 24, and may write the integrated CRC information together with the data and the second DIF information to the non-volatile memory 24. The integrated CRC may be transmitted between the memory controller 22 and the non-volatile memory 24, and may not be transmitted to the host 10.

The data received from the host may include first sub-data and second sub-data. The memory controller 22 may receive third DIF information relating to the first sub-data and fourth DIF information relating to the second sub-data from the host 10. Here, the third DIF information and the fourth DIF information may respectively include individual CRC information. For example, the third DIF information may include individual CRC information corresponding to (e.g., generated based on) the first sub-data, and fourth DIF information may include individual CRC information corresponding to (e.g., generated based on) the second sub-data. The memory controller 22 may generate integrated CRC information according to a data layout set for the first sub-data and the second sub-data, and may write the integrated CRC information, to the non-volatile memory 24, in some implementations along with other DIF information that is different from the third DIF information and the fourth DIF information. For example, the other DIF information can include fifth and sixth DIF information generated based on the third and fourth DIF information, respectively, but having a different data structure than the third and fourth DIF information, e.g., not including guard tags GRD of the third and fourth DIF information.

When subsequently performing a read operation, the memory controller 22 may read the fifth DIF information and the sixth DIF information from the non-volatile memory 24; may generate individual CRC information based on the first sub-data and the second sub-data, respectively; may add a guard tag to the fifth DIF information and the sixth DIF information by using the respective generated individual CRC information; and may transmit the fifth DIF information and the sixth DIF information to which the guard tags have been added to the host 20.

Figure 8:
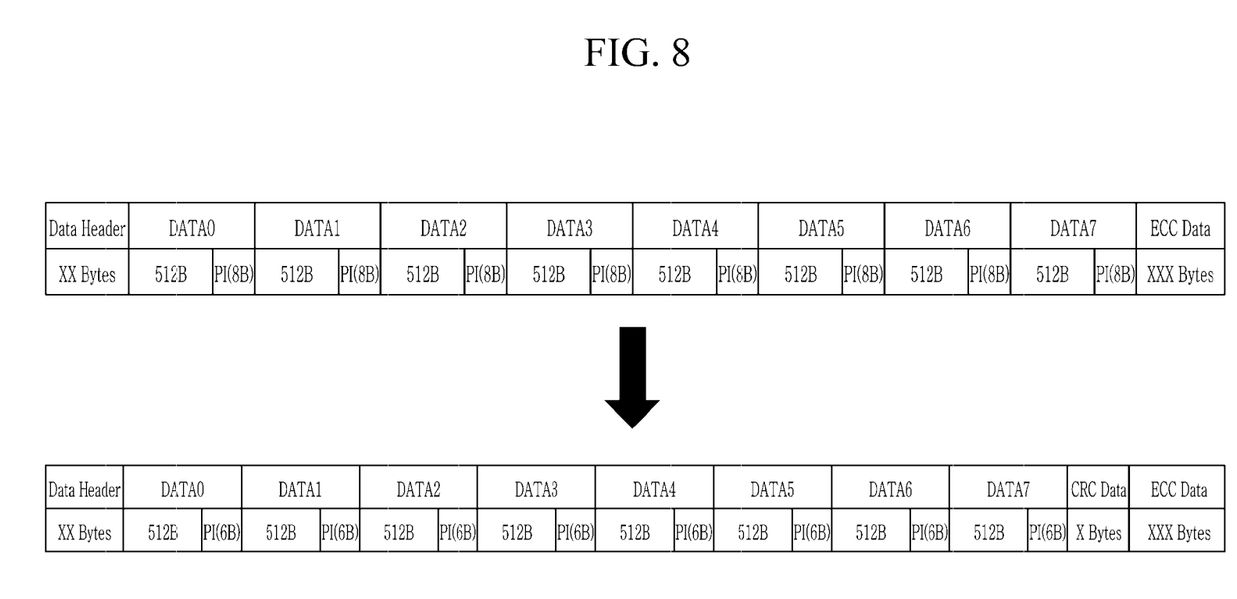
FIG. 8 shows a data layout of a memory device according to some implementations.

FIG. 8 shows a data layout of a memory device according to some implementations.

Referring to FIG. 8, when transmitting the data to be written to the non-volatile memory 24, the host 10 may additionally transmit protection information (PI) (i.e., DIF information) for data integrity. The PI may be used for verification of integrity by the memory controller 22 and may be stored in the non-volatile memory 24, and in this case, the non-volatile memory 24 has low storage efficiency as it must have a storage space for the PI that corresponds to additional information as well as the user data. The non-volatile memory 24 may use a data layout such as 4 KB, 8 KB, or 16 KB, where 4 KB, 8 KB, and 16 KB refer to sizes of sectors of the non-volatile memory 24. FIG. 8 shows data structures for the 4 KB data layout; corresponding principles can extend the described process to apply to other data layouts.

The top of FIG. 8 illustrates a data structure for storage of data (e.g., in the non-volatile memory 24) with individual CRC information, e.g., without generation of CRC information. In this example, the data includes eight sub-data of 512B. The data may be provided with a respective PI for each sub-data. To store the 512B×8=4096B user data, meta data, such as a data header, a PI, ECC data, and/or other meta data, are written to the non-volatile memory 24. In some cases, a region of memory allocated to the meta data may correspond to about 10% of the entire memory region. Without the use of integrated CRC information, the PI for each sub-data is 8B including a 2B guard tag GRD that includes corresponding CRC information (e.g., CRC-16) generated based on the sub-data. Accordingly, in this example, 8B×8=64B are allocated for the PI for verifying integrity of the data, and the guard tags CRC-16 occupy a total of 2B×8=16B.

The bottom of FIG. 8 illustrates a data structure for storage of data (e.g., in the non-volatile memory 24) with integrated CRC information, which can provide an improvement to storage efficiency. The integrated CRC information may be generated by the memory controller 22 based on the data as a whole, e.g., based on all eight sub-data in this example. For example, the memory controller 22 may apply a modulo-2 polynomial division process to the 4096B of user data collectively.

The integrated CRC information may be smaller than (e.g., include fewer bytes than) the sum of the individual CRC information. This can reduce a total amount of storage space dedicated to CRC information, improving storage efficiency. In the example of FIG. 8, the size of the integrated CRC information for verifying of the 4 KB data according to the size of the data layout of the non-volatile memory 24 is allocated to be less than 16B. For example, instead of guaranteeing the data integrity using one 2B CRC-16 information per each 512B (per each sub-data), a single CRC-32 information, having a size of 4B, can be used for the 4 KB of total data. Accordingly, t 12B of storage space is saved, compared to the method shown at the top of FIG. 8.

As described above, the integrated CRC information can be generated by the memory controller 22 based on the data received from the host 10, and the integrated CRC information, together with the data and, in some implementations, additional metadata, can be written to the non-volatile memory 24 by the memory controller 22. In some implementations, the metadata written to the non-volatile memory 24 includes DIF information for each sub-data. The DIF information written for each sub-data may be the DIF information received from the host 10 for each sub-data, minus the individual CRC information for each sub-data and/or minus a portion of the DIF information that includes the individual CRC information. For example, for each sub-data, the memory controller 22 may receive an application tag APP, a reference tag REF, and a guard tag GRD as described above, the guard tag GRD including individual CRC information for the sub-data. When the memory controller 22 writes the data to the non-volatile memory 24, the memory controller 22 may write the application tags APP and reference tags REF for each sub-data to the non-volatile memory 24, without writing the guard tags GRD. The application tags APP and the reference tags REF are second DIF information, in contrast to the first DIF information that includes application tags APP, reference tags REF, and guard tags GRD including individual CRC information. Because the memory controller 22 further writes the integrated CRC information, the individual CRC information included in each guard tag GRD need not be written for data integrity verification. In the example of FIG. 8 with integrated CRC information, the ref tag RF and the application tag APP for each sub-data consume a total of 6B of PI written to the non-volatile memory 24 for each sub-data, as shown at the bottom of FIG. 8.

The data storage space saved by storing integrated CRC information instead of multiple individual CRC information can be used for one or more suitable purposes. In some implementations, the storage space may be given to increase the amount of ECC data. That is, the XXXB of ECC data at the bottom of FIG. 8 may be larger than the XXXB of ECC data at the top of FIG. 8. The increased ECC data can provide longer lifespan and higher reliability for data storage in the non-volatile memory 24.

In some implementations, to perform a corresponding read operation (e.g., in response to a read request from a host), the memory controller reads the multiple sub-data and the multiple written DIF information corresponding to each sub-data, such as an application tag APP and a reference tag REF for each sub-data. The memory controller generates individual CRC information for each sub-data based on the sub-data, e.g., by processing the sub-data using one or more algorithms. The memory controller adds the generated individual CRC information for each sub-data to the DIF information for the sub-data, e.g., to obtain new DIF information for each sub-data. For example, the memory controller may add a guard tag GRD to each DIF information, where the guard tag GRD includes the generated individual CRC information for the sub-data. The memory controller can then send the data (including the multiple sub-data) and the multiple DIF information (each including individual CRC information generated by the memory controller) to the host.

The method for the host 10 to transmit data to the memory controller 22 is not limited to what is described with reference to FIG. 8. Referring to FIG. 3, the method for the host 10 to transmit data to the memory controller 22 may become different according to the data to be written to the non-volatile memory 24. For example, when the data to be written to the non-volatile memory 24 are the data DATA0, DATA1, and DATA2 shown in FIG. 8, the host 10 may transmit the data DATA0, DATA1, and DATA2 to the memory controller 22. In this instance, when the addition of the PI to the data DATA0 is defined to be a first packet, the addition of the PI to the data DATA1 is defined to be a second packet, and the addition of the PI to the data DATA2 is defined to be a third packet, and the data to be written to the non-volatile memory 24 are data DATA0, DATA1, and DATA2 shown in FIG. 8, the host 10 may transmit the first packet, the second packet, and the third packet to the memory controller 22. That is, for all implementations described throughout this disclosure, the number of packets transmitted by the host 10 to transmit data and corresponding DIF information/PI, and the combination(s) of data and DIF information/PI in each packet may be set in various ways, without being limited to a particular number of packets or type of data within each packet.

Detailed transmission specifications such as the sizes of the additional data including the data header, the integrated CRC information, and the ECC data, and the number of packets included between the data header and the integrated CRC information may be different in different implementations, e.g., according to data structures and memory types associated with the non-volatile memory 24. For example, to write to the non-volatile memory 24 realized according one example of a memory data structure, the memory controller 22 may transmit 16 KB data and 2 KB additional data (including data header, integrated CRC information, and ECC data) to the non-volatile memory 24. In the above-described case of reducing required storage space by 12B, the memory controller 22 transmits eight packets to the non-volatile memory 24, and the size of the integrated CRC information is reduced to four bytes (for transmission to the non-volatile memory 24 from the memory controller 22) from sixteen bytes (for transmission to the memory controller 22 from the host 10), such that twelve bytes are saved to be used for another purpose (e.g., expansion of the ECC data). However, in various implementations, amounts or ratios of the actually reduced storage space, number of sub-data corresponding to integrated CRC information, amount of data in each sub-data, data size of individual CRC information, and/or data size of integrated CRC information may vary, while still remaining within the scope of this disclosure for structuring the non-volatile memory 24, formatting data for data transmission from the host 10 to the memory controller 22, and/or structuring/configuring operations of the memory controller 22.

In some implementations, in the case of integrated CRC information generated for a data group of multiple individual data (such as DATA0-DATA7 in the example of FIG. 8), the integrated CRC information is generated for a subset of the data group. For example, a range and/or number of the individual data for which the integrated CRC information is generated may be changed, e.g., by a user. For example, one integrated CRC information may be set to be generated for a predetermined number of individual data, such as eight individual data together or other numbers (e.g., 16) of the individual data. The predetermined number may be stored in a storage element such as a register (e.g., a register of the memory controller 22 or a register of the non-volatile memory 24) and/or may be received from an external device. Hence, the amount of the data covered by the integrated CRC information may be varied and may be used according to varying operational conditions or operational purposes of the non-volatile memory 24.

In some implementations, the memory controller 22 is configured to determine a structure of DIF information to be written to the non-volatile memory 24 based on one or more predetermined operation modes. For example, the predetermined operation mode may include a first operation mode and a second operation mode. The memory controller 22 may determine the operation mode based on a setting value indicative of the operation mode in a storage element such as a register e.g., a register of the memory controller 22 or a register of the non-volatile memory 24, and/or the memory controller 22 may receive the setting value from the external device.

In some implementations, when the predetermined operation mode is the first operation mode, the memory controller 22 generates second DIF information having a structure that is different from that of the first DIF information, may write the second DIF information to the non-volatile memory 24, and may not write the first DIF information to the non-volatile memory 24. Correspondingly, to subsequently perform a read operation, the memory controller 22 may read the second DIF information from the non-volatile memory 24, may generate individual CRC information on the data read from the non-volatile memory 24, may generate third DIF information generated by adding a guard tag to the second DIF information by using the generated individual CRC information, and may transmit the third DIF information to the host.

In some implementations, when the predetermined operation mode is the first operation mode and the memory controller 22 has access to information on the data layout of the non-volatile memory 24, the memory controller 22 may generate integrated CRC information based on the data layout of the non-volatile memory 24, and may write the second DIF information and the integrated CRC information to the non-volatile memory 24. When there is no information on the data layout on the non-volatile memory 24, differing from what is described above, the memory controller 22 may write the second DIF information to the non-volatile memory 24, and may generate individual CRC information at a later time.

In some implementations, when the predetermined operation mode is the second operation mode, differing from what is described above, the memory controller 22 may write the first DIF information to the non-volatile memory 24.

As the memory controller 22 is operated in a different way according to the predetermined operation mode as described above, it may be varied to be operated according to the operational condition or the operational purpose of the non-volatile memory 24. For example, it may be operated in the first operation mode in the operational condition aiming at improving the storage efficiency on the non-volatile memory 24, and it may be operated in the second operation mode when there is a special purpose for manipulating the guard tag generated by the host 10 in the non-volatile memory 24 rather than improving the storage efficiency.

Figure 9:
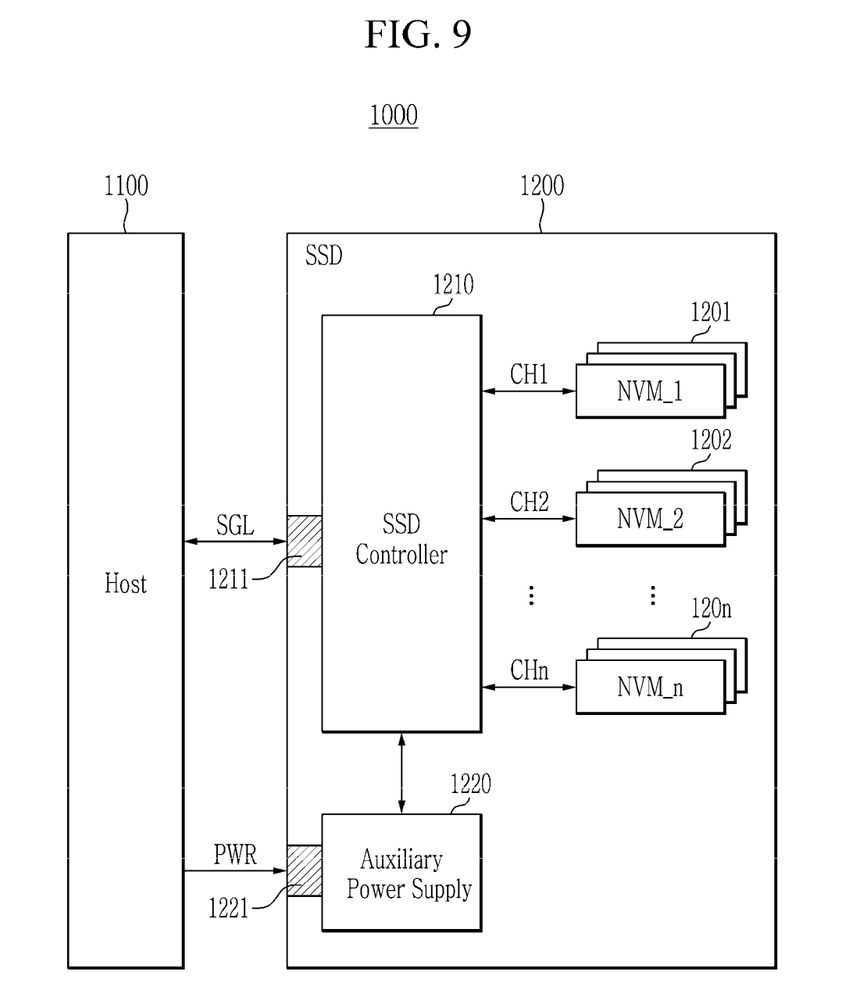
FIG. 9 shows a memory device according to some implementations.

FIG. 9 shows a memory device according to some implementations.

Referring to FIG. 9, the memory system 1000 may be a solid state drive (SSD) system. The memory system 1000 may include a host 1100 and an SSD 1200.

The SSD 1200 may include a plurality of flash memories 1201 to 120*n* (n is a natural number), an SSD controller 1210, and an auxiliary power supply 1220. The SSD 1200 may transmit/receive signals SGL to/from the host 1100 through a signal connector 1211. The signal SGL may include a command, an address, and data. The SSD controller 1210 may write data to a flash memory designated according to the command of the host 1100 or may read data from the flash memory.

A plurality of flash memories 1201 to 120*n* may be used as a storage medium of the SSD 1200. The SSD 1200 may use a non-volatile memory such as a PRAM, an MRAM, a ReRAM, or a FRAM in addition to the flash memories. The flash memories 1201 to 120*n* may be connected to the SSD controller 1210 through a plurality of channels CH1 to CHn (n is a natural number). One or more flash memories may be connected to one channel. The flash memory connected on one channel may be connected to a same data bus.

The SSD controller 1210 may be operated based on the operation method described with reference to FIG. 1 to FIG. 8. Here, the SSD controller 1210 may be the memory controller described with reference to FIG. 1 to FIG. 8. For example, the SSD controller 1210 may be operated based on the method described with reference to FIG. 1 to FIG. 8.

The auxiliary power supply 1220 may be connected to the host 1100 through the power connector 1221. The auxiliary power supply 1220 may receive a power voltage (PWR) from the host 1100 and may be charged. The auxiliary power supply 1220 may be positioned in the SSD 1200 or may be positioned outside the SSD 1200. For example, the auxiliary power supply 1220 may be positioned on a main board to supply an auxiliary power voltage to the SSD 1200.

Figure 10:
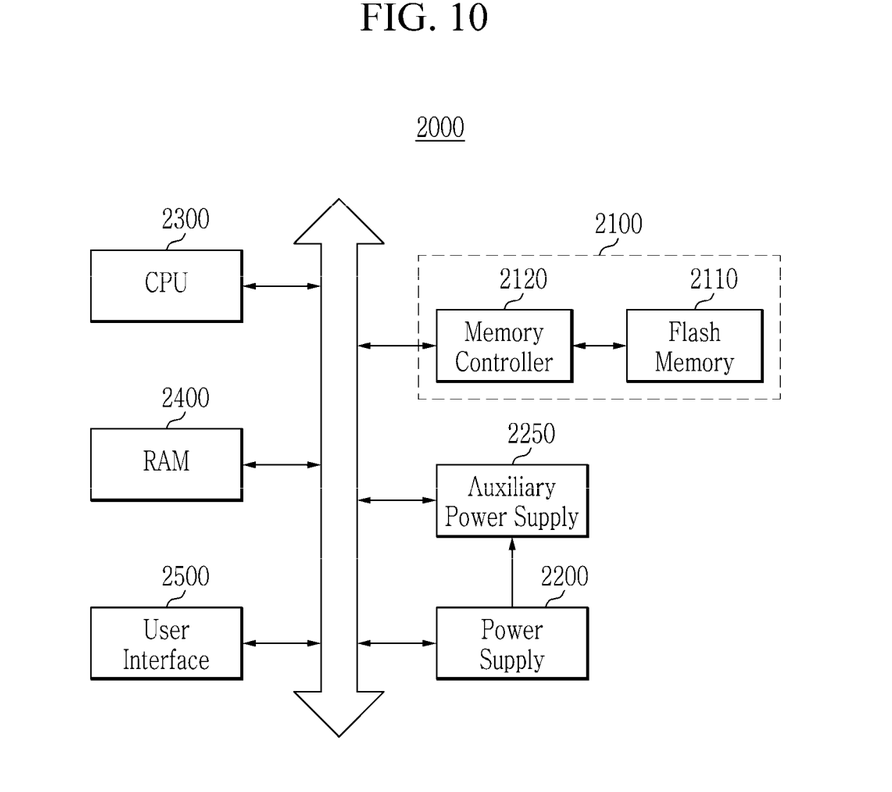
FIG. 10 shows a computing system according to some implementations.

FIG. 10 shows a computing system according to some implementations.

Referring to FIG. 10, the computing system 2000 may be the electronic system to which the memory device 2100 described with reference to FIG. 1 to FIG. 8 is applied. The computing system 2000 may be realized into a UMPC (Ultra Mobile PC), a workstation, a net-book, PDA (Personal Digital Assistants), a portable computer, a web tablet, a wireless phone, a mobile phone, a smartphone, an e-book, a PMP (Portable Multimedia Player), a portable game device, a navigation device, a black box, a digital camera, a DMB (Digital Multimedia Broadcasting) reproducer, a digital audio recorder, a digital audio player, a digital picture recorder, a digital picture player, a digital video recorder, and a digital video player.

Referring to FIG. 10, the computing system 2000 may include a memory system 2100, a power supply 2200, an auxiliary power supply 2250, a central processing unit 2300, a RAM 2400, and a user interface 2500. The memory system 2100 may include a flash memory 2110 and a memory controller 2120. The memory system 2100 may be the memory system described with reference to FIG. 1 to FIG. 8. For example, the memory controller 2120 may be operable based on the methods described with reference to FIG. 1 to FIG. 8. The memory controller 2120 may be configured to perform the methods described with reference to FIG. 1 to FIG. 8, e.g., based on circuitry of the memory controller 2120 being configured to perform the methods and/or based on the memory controller 2120 including a storage, and/or being communicatively coupled to a storage, storing instructions that, when executed by one or more processing devices of the memory controller 2120, cause the memory controller 2120 to perform the methods.

While this technology has been described in connection with what is presently considered to be practical implementations, it is to be understood that the disclosure is not limited to the disclosed implementations, but, on the contrary, is intended to cover various modifications and equivalent arrangements included within the spirit and scope of the appended claims.

What is claimed is:

1. A memory device comprising:
a non-volatile memory; and
a memory controller configured to write data received from a host to the non-volatile memory,
wherein the memory controller is configured to:
receive, from the host, first data integrity field (DIF) information associated with the data, the first DIF information including cyclic redundancy check (CRC) information generated based on the data,
generate, based on the first DIF information, second DIF information having a structure that is different from a structure of the first DIF information, and
write the second DIF information to the non-volatile memory.

2. The memory device of claim 1, wherein the first DIF information includes a guard tag, an application tag, and a reference tag, and
wherein the second DIF information includes the application tag and the reference tag, but does not include the guard tag.

3. The memory device of claim 1, wherein the second DIF information does not include the CRC information.

4. The memory device of claim 1, wherein the second DIF information has a smaller storage size than the first DIF information.

5. The memory device of claim 1, wherein the memory controller is configured to discard the first DIF information.

6. The memory device of claim 1, wherein the memory controller is configured to, in response to a read request from the host:
read the second DIF information from the non-volatile memory,
generate second CRC information based on the data,
add a guard tag to the second DIF information, the guard tag including the second CRC information, to obtain third DIF information, and
transmit the third DIF information to the host.

7. The memory device of claim 1, wherein the memory controller is configured to:
generate integrated CRC information based on the data and based on a data layout of the non-volatile memory, and
write the integrated CRC information to the non-volatile memory.

8. The memory device of claim 7, wherein the integrated CRC information is transmitted between the memory controller and the non-volatile memory, but is not transmitted to the host.

9. The memory device of claim 7, wherein the data includes first sub-data and second sub-data, and
wherein the memory controller is configured to generate the integrated CRC information based on the first sub-data and the second sub-data.

10. The memory device of claim 7, wherein the data includes a plurality of sub-data,
wherein the first DIF information includes respective individual CRC information for each sub-data of the plurality of sub-data, and
wherein the integrated CRC information has a smaller storage size than a total storage size of the individual CRC information of the first DIF information.

11. The memory device of claim 10, wherein the memory controller is configured to, in response to a read request:
for each sub-data of the plurality of sub-data, generate corresponding individual CRC information based on the sub-data;
read, from the non-volatile memory, corresponding DIF information for each sub-data of the plurality of sub-data;
add a guard tag to the corresponding DIF information of each sub-data of the plurality of sub-data, to obtain corresponding new DIF information for each sub-data of the plurality of sub-data, wherein each guard tag includes the corresponding individual CRC information generated based on the corresponding sub-data; and
transmit, to the host, the corresponding new DIF information for each sub-data of the plurality of sub-data.

12. The memory device of claim 7, wherein
the integrated CRC information is generated for a subset of the data.

13. The memory device of claim 12, wherein
a setting value for the subset of the data is changeable to select the subset of the data for which the integrated CRC information is generated.

14. A memory device comprising:
a non-volatile memory; and
a memory controller configured to:
receive, from a host, first data integrity field (DIF) information corresponding to data to be written to the non-volatile memory, and
based on a first operation mode, generate second DIF information having a structure that is different from a structure of the first DIF information, and write the second DIF information to the non-volatile memory.

15. The memory device of claim 14, wherein the memory controller is configured to discard the first DIF information.

16. The memory device of claim 14, wherein the memory controller is configured to:
based on a second operation mode, write the first DIF information to the non-volatile memory.

17. A method for operating a memory device, the method comprising:
receiving, from a host, first data integrity field (DIF) information corresponding to data to be written to a non-volatile memory;
generating, based on the first DIF information, second DIF information having a structure that is different from a structure of the first DIF information; and
writing the second DIF information to the non-volatile memory.

18. The method of claim 17, wherein the first DIF information includes a guard tag, an application tag, and a reference tag, and
wherein the second DIF information includes the application tag and the reference tag, but does not include the guard tag.

19. The method of claim 17, wherein the first DIF information includes cyclic redundancy check (CRC) information, and
wherein the second DIF information does not include the CRC information.

20. The method of claim 17, further comprising:
reading the second DIF information from the non-volatile memory;
generating CRC information based on the data;
adding a guard tag to the second DIF information, the guard tag including the generated CRC information, to obtain third DIF information; and
transmitting the third DIF information to the host.

21. The method of claim 17, further comprising:
generating integrated CRC information based on the data and based on a data layout of the non-volatile memory, and
writing the integrated CRC information to the non-volatile memory.

* * * * *